(12) United States Patent
Deka et al.

(10) Patent No.: US 12,509,404 B2
(45) Date of Patent: Dec. 30, 2025

(54) PROCESSES FOR MAKING A SUPER-INSULATING CORE FOR A VACUUM INSULATING STRUCTURE

(71) Applicant: WHIRLPOOL CORPORATION, Benton Harbor, MI (US)

(72) Inventors: Lakshya J. Deka, Mishawaka, IN (US); Eric J. Vasko, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 18/769,816

(22) Filed: Jul. 11, 2024

(65) Prior Publication Data
US 2024/0360044 A1     Oct. 31, 2024

Related U.S. Application Data

(60) Continuation of application No. 18/333,088, filed on Jun. 12, 2023, now Pat. No. 12,065,386, which is a
(Continued)

(51) Int. Cl.
    *C04B 38/00*       (2006.01)
    *C03C 17/00*       (2006.01)
    (Continued)

(52) U.S. Cl.
    CPC .......... *C04B 38/009* (2013.01); *C03C 17/001* (2013.01); *C03C 17/25* (2013.01);
    (Continued)

(58) Field of Classification Search
None
See application file for complete search history.

(56) References Cited

U.S. PATENT DOCUMENTS

| | | | |
|---|---|---|---|
| 2,806,509 A | 9/1957 | Bozzacco et al. | |
| 3,510,392 A | 5/1970 | Eustachio et al. | |
| (Continued) | | | |

FOREIGN PATENT DOCUMENTS

| | | |
|---|---|---|
| CA | 626838 A | 9/1961 |
| EP | 2883850 A1 | 6/2015 |
| (Continued) | | |

*Primary Examiner* — Alexander M Weddle
(74) *Attorney, Agent, or Firm* — Price Heneveld LLP

(57) ABSTRACT

A method for forming a super-insulating material for a vacuum insulated structure for an appliance includes disposing hollow glass spheres within a rotating drum, wherein a plurality of interstitial spaces are defined between the hollow glass spheres. An anchor material is disposed within the rotating drum. The hollow glass spheres and the anchor material are rotated within the rotating drum, wherein the anchor material is mixed with the hollow glass spheres to partially occupy the interstitial spaces. A silica-based material is disposed within the rotating drum. The silica-based material is mixed with the anchor material and the hollow glass spheres to define a super-insulating material, wherein the silica-based material attaches to the anchor material and is entrapped within the interstitial spaces. The silica-based material and the anchor material occupy substantially all of an interstitial volume defined by the interstitial spaces.

20 Claims, 13 Drawing Sheets

Related U.S. Application Data division of application No. 16/308,531, filed as application No. PCT/US2016/054067 on Sep. 28, 2016, now Pat. No. 11,731,913.

(51) Int. Cl.

| | | |
|---|---|---|
| *C03C 17/25* | (2006.01) | |
| *C04B 14/24* | (2006.01) | |
| *C04B 20/10* | (2006.01) | |
| *C04B 26/02* | (2006.01) | |
| *C04B 26/04* | (2006.01) | |
| *C04B 26/06* | (2006.01) | |
| *C04B 26/24* | (2006.01) | |
| *C04B 28/24* | (2006.01) | |
| *C04B 28/26* | (2006.01) | |
| *C04B 30/02* | (2006.01) | |
| *C04B 38/08* | (2006.01) | |
| *C04B 111/28* | (2006.01) | |
| *F16L 59/02* | (2006.01) | |
| *F25D 23/06* | (2006.01) | |

(52) U.S. Cl.
CPC .......... *C04B 14/24* (2013.01); *C04B 20/1033* (2013.01); *C04B 20/1037* (2013.01); *C04B 20/104* (2013.01); *C04B 20/1048* (2013.01); *C04B 26/02* (2013.01); *C04B 26/04* (2013.01); *C04B 26/06* (2013.01); *C04B 26/24* (2013.01); *C04B 28/24* (2013.01); *C04B 28/26* (2013.01); *C04B 30/02* (2013.01); *C04B 38/08* (2013.01); *F16L 59/028* (2013.01); *F16L 59/029* (2013.01); *C03C 2218/111* (2013.01); *C04B 2111/28* (2013.01); *C04B 2201/30* (2013.01); *F25D 23/06* (2013.01); *F25D 2201/14* (2013.01); *Y02W 30/91* (2015.05)

(56) References Cited

U.S. PATENT DOCUMENTS

| | | |
|---|---|---|
| 3,769,770 A | 11/1973 | Deschamps et al. |
| 5,665,787 A | 9/1997 | Nowak et al. |
| 5,713,974 A | 2/1998 | Martin et al. |
| 6,207,280 B1 | 3/2001 | Atarashi et al. |
| 6,221,456 B1 | 4/2001 | Pogorski et al. |
| 6,858,280 B2 | 2/2005 | Allen et al. |
| 7,037,865 B1 | 5/2006 | Kimberly |
| 7,416,690 B2 | 8/2008 | Haun |
| 7,732,032 B2 | 6/2010 | Dubey |
| 7,833,342 B2 | 11/2010 | Sambasivan et al. |
| 7,985,367 B2 | 7/2011 | Hiromatsu et al. |
| 9,770,848 B2 | 9/2017 | Baek et al. |
| 9,879,515 B2 | 1/2018 | Green et al. |
| 11,247,432 B2 | 2/2022 | Deka et al. |
| 2004/0077738 A1 | 4/2004 | Field et al. |
| 2005/0242477 A1 | 11/2005 | Haun |
| 2012/0118318 A1 | 5/2012 | Hillebrandt Poulsen et al. |
| 2013/0081812 A1 | 4/2013 | Green et al. |
| 2015/0147514 A1 | 5/2015 | Shinohara et al. |
| 2019/0144343 A1 | 5/2019 | Deka et al. |
| 2020/0231502 A1 | 7/2020 | Strickland |
| 2022/0118737 A1 | 4/2022 | Deka et al. |

FOREIGN PATENT DOCUMENTS

| | | | |
|---|---|---|---|
| EP | 2889526 A1 * | 7/2015 | ............ F16L 59/065 |
| EP | 3387317 A1 | 10/2018 | |
| JP | 2003042386 A | 2/2003 | |
| JP | 2014133678 A | 7/2014 | |
| RU | 2414288 C2 | 3/2011 | |
| WO | 9603555 A1 | 2/1996 | |
| WO | 03097227 A1 | 11/2003 | |
| WO | 2006073540 A2 | 7/2006 | |
| WO | 2008118536 A2 | 10/2008 | |
| WO | 2014184393 A1 | 11/2014 | |

\* cited by examiner

PROCESSES FOR MAKING A SUPER-INSULATING CORE FOR A VACUUM INSULATING STRUCTURE

CROSS-REFERENCE TO RELATED APPLICATION

The present application is a continuation of U.S. patent application Ser. No. 18/333,088 filed Jun. 12, 2023, now U.S. Pat. No. 12,065,386, which is a divisional of U.S. patent application Ser. No. 16/308,531 filed Dec. 10, 2018, now U.S. Pat. No. 11,731,913, which is a national stage of International Application No. PCT/US2016/054067 filed Sep. 28, 2016, all of which are entitled PROCESSES FOR MAKING A SUPER-INSULATING CORE FOR A VACUUM INSULATING STRUCTURE, the entire disclosures of which are hereby incorporated herein by reference.

FIELD OF THE DEVICE

The device is in the field of insulating materials for appliances, and more specifically, various processes for making super-insulating core materials that can be included within vacuum insulated structures for various appliances.

SUMMARY

In at least one aspect, a method for forming a super-insulating material for a vacuum insulated structure for an appliance includes disposing hollow glass spheres within a rotating drum, wherein a plurality of interstitial spaces are defined between the hollow glass spheres. An anchor material is disposed within the rotating drum. The hollow glass spheres and the anchor material are rotated within the rotating drum, wherein the anchor material is mixed with the hollow glass spheres to partially occupy the interstitial spaces. A silica-based material is disposed within the rotating drum. The silica-based material is mixed with the anchor material and the hollow glass spheres to define a super-insulating material, wherein the silica-based material attaches to the anchor material and is entrapped within the interstitial spaces. The silica-based material and the anchor material occupy substantially all of an interstitial volume defined by the interstitial spaces.

In at least another aspect, a method for forming a super-insulating material for a vacuum insulated structure for an appliance includes disposing glass spheres within a rotating drum, wherein a plurality of interstitial spaces are defined between the glass spheres. A coating material is disposed within the rotating drum. The glass spheres and the coating material are mixed to define an adhering base material, wherein the interstitial spaces of the glass spheres are partially occupied by the coating material. A silica-based material is disposed within the rotating drum. The silica-based material is mixed with the glass spheres and the coating material to define a super-insulating material, wherein the silica-based material adheres to the glass spheres via the coating material, wherein the coating material and the silica-based material occupy substantially all of an interstitial volume defined by the interstitial spaces.

In at least another aspect, a method for forming a super-insulating material for a vacuum insulated structure for an appliance includes disposing a process fluid in a rotating drum, disposing a silica-based material into the fluid within the rotating drum to form a silica-based liquid, disposing glass spheres within the silica-based liquid, mixing the glass spheres with the silica-based liquid and removing at least a portion of the fluid from the silica-based liquid. The silica-based material adheres to the glass spheres to define silica-coated spheres to form a super-insulating material, wherein a surface of the silica-coated spheres is indicative of the silica-based material.

In at least another aspect, a method for forming a super-insulating material for a vacuum insulated structure for an appliance includes disposing a silica-based material into a mixing drum, wherein the mixing drum includes at least one mixing impeller. An opacifier is disposed into the mixing drum, wherein the silica-based material is mixed with the opacifier. A granulation fluid is disposed into the mixing drum, wherein the granulation fluid is combined with the silica-based material and the opacifier. A first fluid portion of the granulation fluid is removed from the mixing drum, wherein a second fluid portion of the granulation fluid bonds with the silica-based material to define a densified silica-based mixture.

These and other features, advantages, and objects of the present device will be further understood and appreciated by those skilled in the art upon studying the following specification, claims, and appended drawings.

DETAILED DESCRIPTION OF EMBODIMENTS

Figure 1:
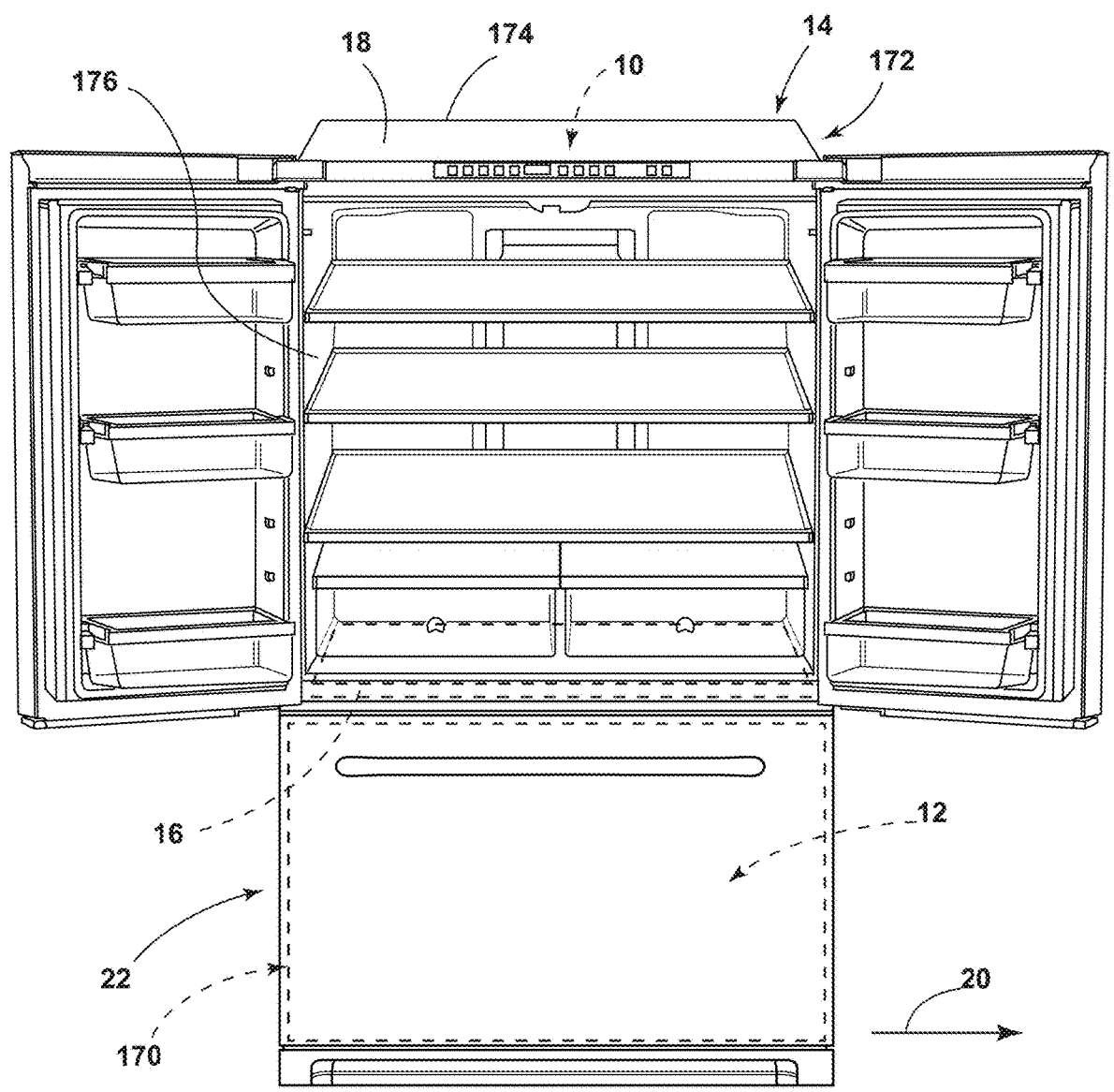
FIG. 1 is a front perspective view of an appliance incorporating a vacuum insulated structure made according to at least one aspect of a process for making a super-insulating core material for a vacuum insulated structure.
Figure 2:
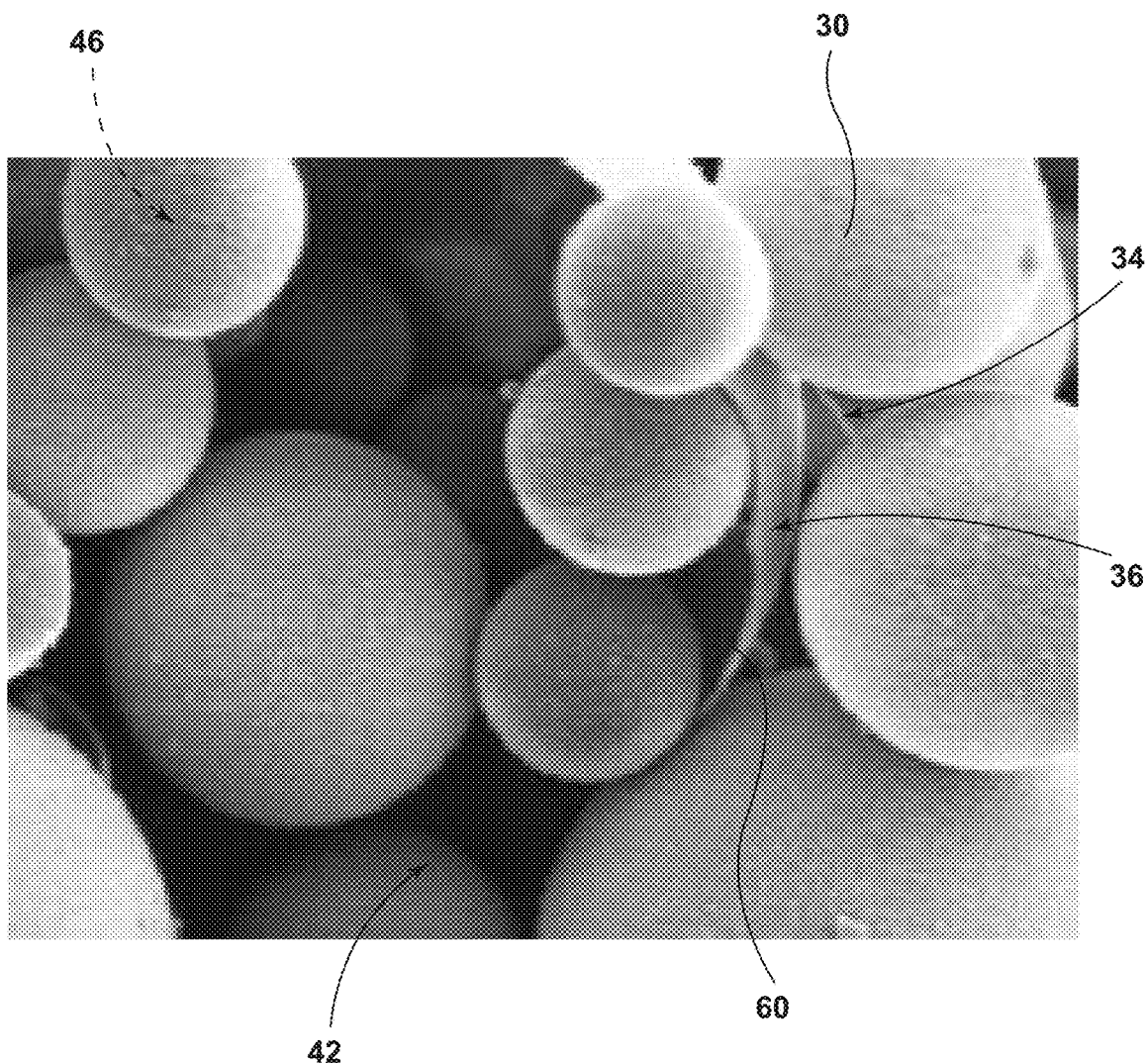
FIG. 2 is a perspective view of an aspect of a super-insulating material made using glass spheres and an anchor material, and exemplifying a step of the process before a silica-based material is added thereto.
Figure 3:
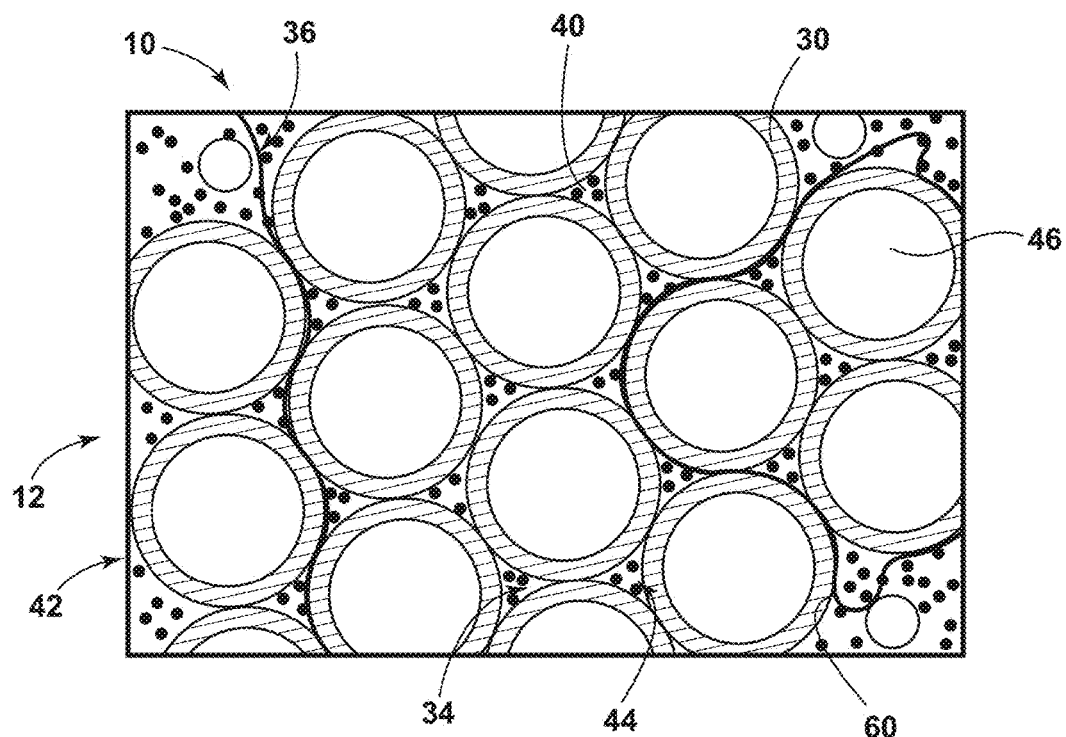
FIG. 3 is a schematic cross-sectional view of the super-insulating material of FIG. 2 with the silica-based material added to the rotating drum.
Figure 4:
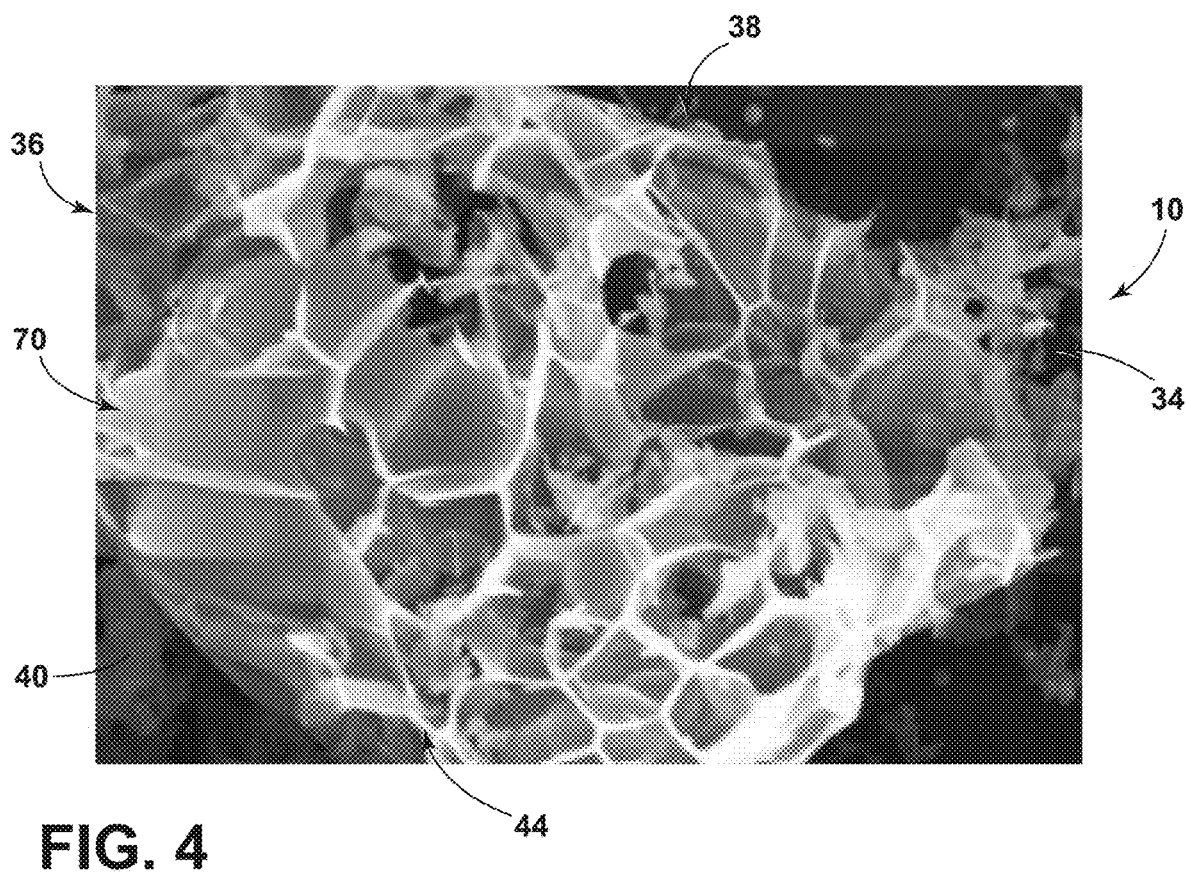
FIG. 4 is a perspective view of an aspect of a super-insulating material made according to a method for an anchor material that is also an insulating material.
Figure 5:
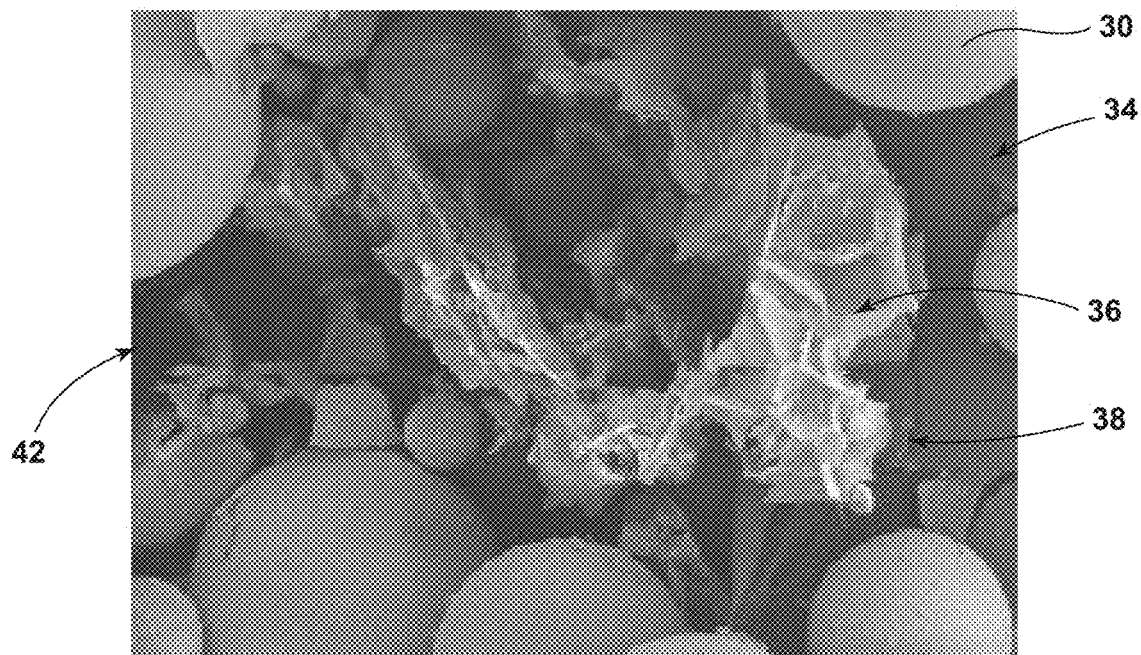
FIG. 5 is an alternate perspective view of the super-insulating material of FIG. 4.
Figure 6:
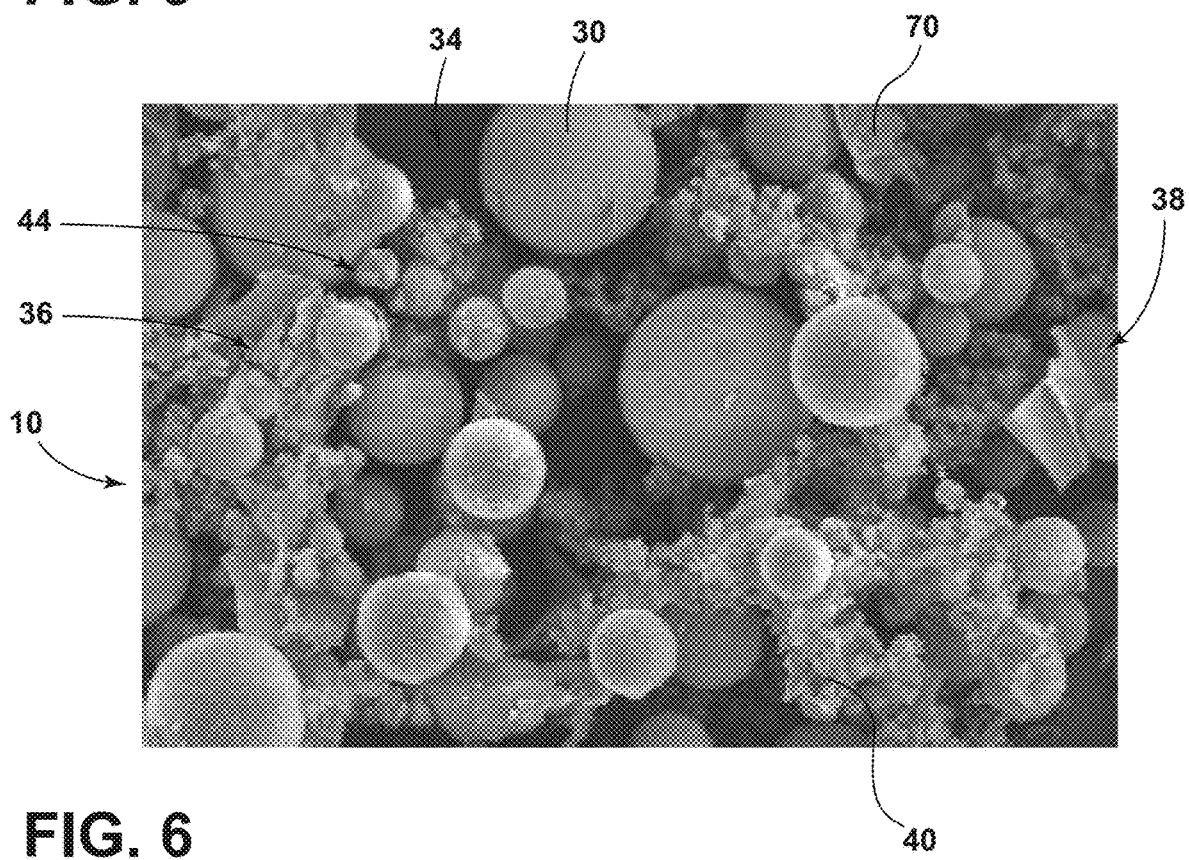
FIG. 6 is a perspective view of the super-insulating material of FIG. 4 illustrating the attachment of the silica-based material with the insulating anchor material.
Figure 7:
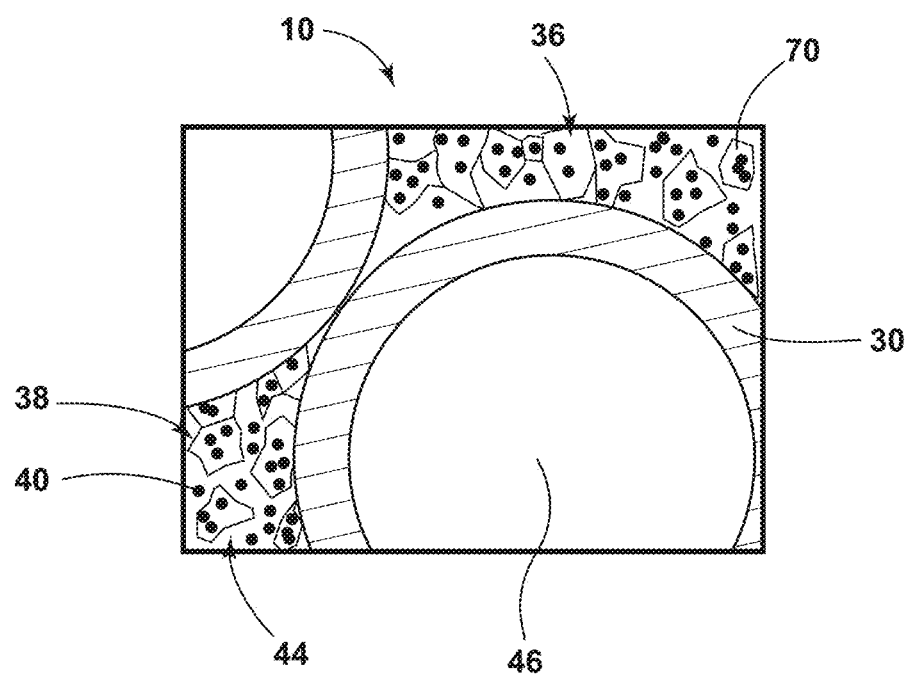
FIG. 7 is a schematic cross-sectional view of the super-insulating material of FIG. 6 showing the silica-based material held in place by the insulating anchor material.
Figure 8:
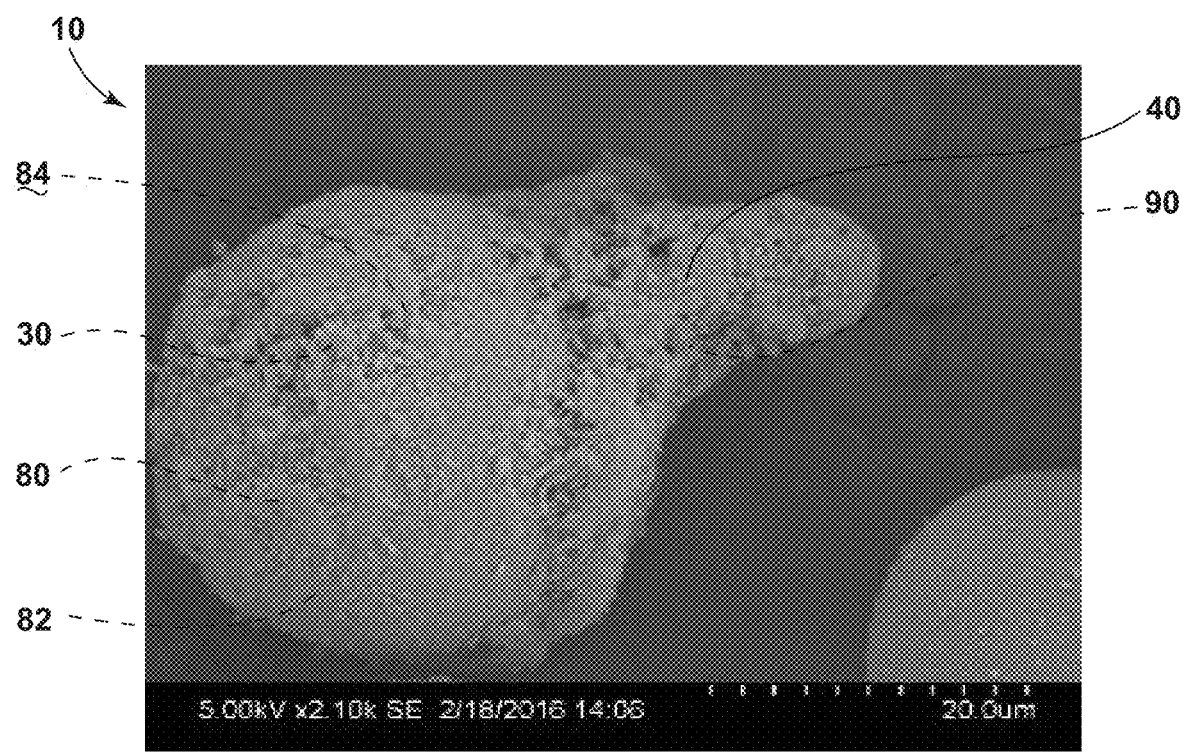
FIG. 8 is an aspect of the super-insulating material made according to a process that includes a coating material disposed on surfaces of the insulating glass spheres.
Figure 9:
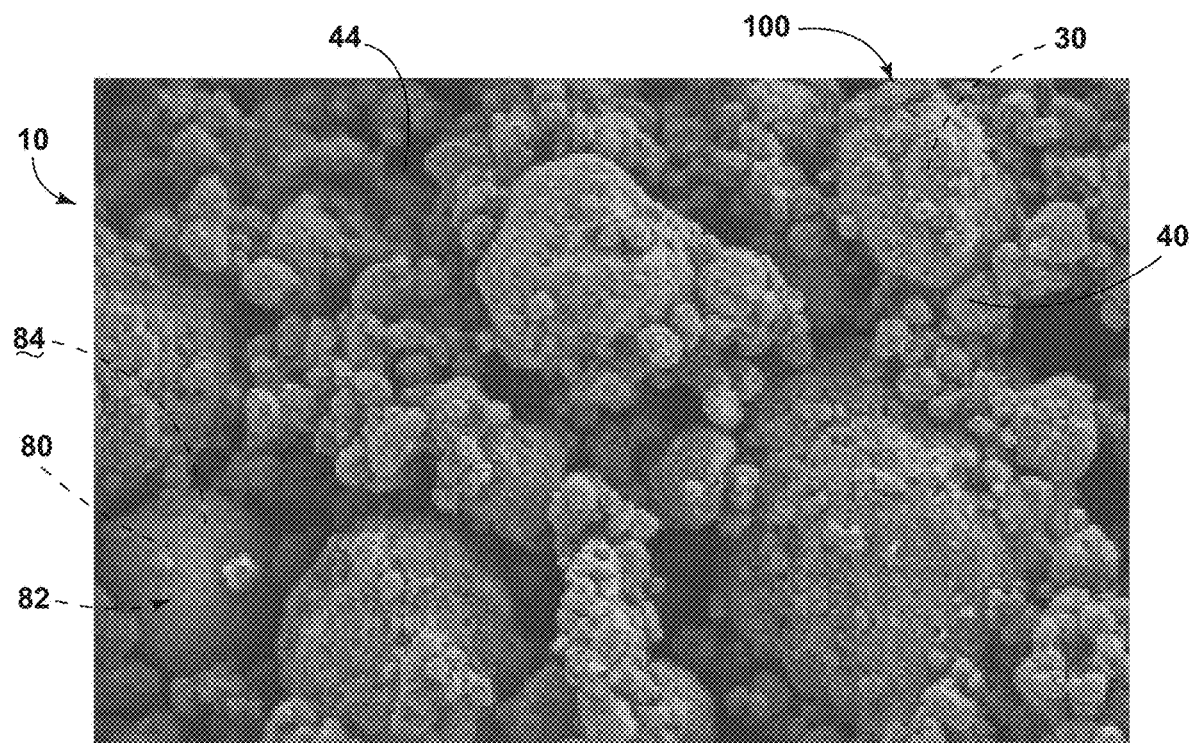
FIG. 9 is a perspective view of the super-insulating material made according to a process that includes a coating material disposed on surfaces of the insulating glass spheres.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As illustrated in FIGS. 1-20, reference numeral 10 generally refers to a super-insulating material formed according to various processes used to form a core material 12 for a vacuum insulated structure 14. According to the various embodiments, the core material 12 can be formed through various methods and then disposed within an insulating cavity 16 of an insulating structure 18. It is contemplated that after formation or substantial formation of the super-insulating material 10, that material can be disposed within the insulating cavity 16. Where the material is sufficiently dense, and includes minimal gaseous pores 44, the insulating structure 18 can be sealed to form the insulating structure 18 having the core of super-insulating material 10 disposed therein.

Typically, additional steps of expressing gas 20 from the insulating cavity 16 having the super-insulating material 10 disposed therein is conducted. According to the various embodiments, the expression of gas 20 from the insulating cavity 16 defines an at least partial vacuum within the insulating cavity 16 of the insulating structure 18. It is contemplated that according to the various aspects of the process for forming the super-insulating material 10, the super-insulating material 10 is sufficiently dense and has a sturdy structure that substantially resists compression. Accordingly, minimal vacuum bow or inward deformation of the insulating structure 18 is experienced during gas expression or other gas expulsion processes. The super-insulating material 10, when disposed within the insulating cavity 16, has a robust structure and density that serves to resist the inward force resulting from a pressure differential between the at least partial vacuum within the insulating cavity 16 and the atmospheric pressure outside of the insulating structure 18. Once gas 20 is expressed from the insulating cavity 16, the insulating structure 18 can be sealed to define the vacuum insulated structure 14, such as a vacuum insulated cabinet or vacuum insulated panel, that is used to insulate various appliances 22. These appliances 22 can include, but are not limited to, refrigerators, freezers, coolers, hot water heaters, ovens, laundry appliances, dishwashers, and other similar appliances 22 in both commercial and household settings. The term "expressed" is used to describe the removal of gas 20 from within the insulating cavity 16. It is contemplated that "expressed" also includes similar processes that involve the expulsion, suction, compression or other similar removal of gas 20.

Referring again to FIGS. 1-7 and 17, a method 400 is disclosed for forming a super-insulating material 10 that can be used as a core material 12 for a vacuum insulated structure 14 for an appliance 22. According to the method 400, glass spheres 30, which can include hollow or solid glass spheres, can be placed within a mixing or rotating drum 32 (shown in FIG. 12) (step 402). It is contemplated that a plurality of interstitial spaces 34 are defined between the glass spheres 30 disposed within the drum 32. An anchor material 36 is also disposed within the drum 32 (step 404). According to the various embodiments, it is contemplated that the anchor material 36 can include various organic and/or inorganic materials. These anchor materials 36 can include, but are not limited to, glass fiber 60, powdered perlite 70, other forms of perlite 70, fibrous micro-sized materials, fibrous nano-sized materials, combinations thereof, and other similar anchor materials 36 that can be used to retain an insulating material within the interstitial spaces 34 between the glass spheres 30. It is also contemplated that the anchor material 36 can also be a secondary insulating material 38, such as in the case of perlite 70 and/or diatomaceous earth powder, which can have independent insulating properties.

Referring again to FIGS. 1-7 and 17, the hollow glass spheres 30 and the anchor material 36 can be rotated or otherwise mixed within the drum 32. In this manner, the anchor material 36 is mixed with the hollow glass spheres 30, such that the anchor material 36 at least partially occupies the interstitial spaces 34. According to the method 400, a silica-based material 40 is disposed within the drum 32 (step 408). The anchor material 36 that is intertwined within the hollow glass spheres 30 along with the silica-based material 40 are mixed to define the super-insulating material 10. It is contemplated that the silica-based material 40 attaches to the anchor material 36 or is retained by the anchor material 36 and is entrapped within the interstitial spaces 34 between the hollow glass spheres 30 and within the anchor material 36 (step 410). It is contemplated that the silica-based material 40 and the anchor material 36 occupy substantially all of the interstitial volume 42 defined by the interstitial spaces 34 between the hollow glass spheres 30. According to the various embodiments, it is contemplated that the silica-based material 40 can be fumed silica, precipitated silica, granular aerogels, micro/nano hollow organic and inorganic spheres, rice husk ash, various opacifiers 142, fibrous insulating material, combinations thereof and other similar insulating materials that can be mixed into the interstitial spaces 34 between the glass spheres 30 and the anchor material 36. Through this process, the size of the various gaseous pores 44 that are defined between the silica-based material 40, the anchor material 36 and the hollow glass spheres 30 can be kept to a minimal size, and typically less than one micron. Additionally, it is contemplated that the hollow glass spheres 30 can include nanospheres, microspheres, and combinations thereof. The hollow glass spheres 30 can also include an interior space 46 that is filled with an insulating gas 20 or can be an at least partial vacuum within the hollow interior space 46 of the hollow glass sphere 30. Also, solid glass spheres 30 may also be used where hollow glass spheres 30 are noted.

Referring again to FIGS. 2 and 3, it is contemplated that the anchor material 36, in the form of glass fiber 60, can have a fiber thickness in a range of 5 microns to approximately 100 microns. It is also contemplated that the glass fiber 60 can have a fiber length in a range of from approximately 2 millimeters to approximately 10 millimeters.

Typically, hollow glass spheres 30 can have a packing density from approximately 50 percent to approximately 74 percent that varies depending upon the process used to form the hollow glass spheres 30. This corresponds to an interstitial volume 42 of from approximately 50 percent to approximately 26 percent. The various interstitial spaces 34 within the interstitial volume 42 can have different dimensions and shapes that typically range from approximately 100 nanometers to approximately 600 microns at different locations of the mixture containing the hollow glass spheres 30. These interstitial spaces 34 can contribute to higher gaseous thermoconnectivity at various pressure levels, such as approximately from 0.1 milibar to approximately 1000 milibar. Significant adverse effects as a result of the interstitial volume 42 can be seen at a pressure above 1 milibar.

According to the various embodiments, in order to reduce this gaseous conduction and in order to form an aspect of the super-insulating material 10, the anchor material 36, typically in a form of organic/inorganic fiber, diatomaceous earth and/or perlite 70 can be introduced up to approximately 1 percent to approximately 40 percent by volume to occupy the interstitial volume 42 during a mixing process with the hollow glass spheres 30. It is contemplated that the mixing process between the hollow glass spheres 30 and the anchor material 36 can also include a single mixing process that includes the silica-based material 40 such that one mixing process is used to form the super-insulating material 10. During the one or more mixing processes, the glass fiber 60 can be distributed in the interstitial volume 42, such that the anchor material 36 entraps the silica-based materials 40 within the interstitial volume 42 as well.

As discussed above, the gaseous pores 44 remaining as a result of the mixing process leads to a reduction of gaseous conduction and gaseous pores 44 having a size along the order of less than 1 micron. The use of the anchor material 36 provides an attachment point for the silica-based material 40 to hold onto in order to occupy the interstitial volume 42. Additionally, less segregation of the silica-based material 40 from the interstitial volume 42 will occur as a result of the anchor material 36 holding the silica-based material 40 within the interstitial volume 42.

According to the various embodiments, as exemplified in FIGS. 1-7 and 17, where perlite 70 is used as an anchor material 36 for the super-insulating material 10, the perlite 70 can include a powder or shale structure that can, similar to the glass fiber 60, entrap the silica-based material 40 within the interstitial volume 42. Because perlite 70 has insulating properties of its own, the use of perlite 70 and/or diatomaceous earth powder can be used as the secondary insulating material 38 to add to the insulating properties of the hollow glass spheres 30 and the silica-based material 40.

Referring now to FIGS. 1, 8, 9 and 18, a method 500 is disclosed for forming an aspect of the super-insulating material 10 that can be included within the vacuum insulating structure 18 for an appliance 22. According to the method 500, hollow and/or solid glass spheres 30 can be disposed within a rotating and/or mixing drum 32 (step 502). It is contemplated that, as discussed above, a plurality of interstitial spaces 34 can be defined between the glass spheres 30. A coating material 80 can be disposed within the drum 32 (step 504). The glass spheres 30 and the coating material 80 can be mixed to define an adhering base material 82 (step 506). According to the various embodiments, the interstitial spaces 34 between the various glass spheres 30 are at least partially occupied by the coating material 80. The silica-based material 40 can then be disposed within the drum 32 (step 508). The silica-based material 40 can then be mixed with the glass spheres 30 and the coating material 80 that defines the adhering base material 82, such that the adhering base material 82 and the silica-based material 40 define the super-insulating material 10 (step 510). It is contemplated that the silica-based material 40 adheres to an outer surface 84 of the glass spheres 30 via the coating material 80. It is further contemplated that the coating material 80 and the silica-based material 40 serve to occupy substantially all of the interstitial volume 42 defined by the interstitial spaces 34 between the glass spheres 30.

Referring again to FIGS. 8, 9 and 18, it is contemplated that the coating material 80 can be in the form of a functional group material 90. This functional group materials 90 can serve to alter the magnetic characteristics of the glass spheres 30. Accordingly, the magnetic characteristics of the glass spheres 30 can be altered to define positively charged surfaces of the glass spheres 30. The silica-based material 40, which typically has a negatively charged character, adheres to the positively charged surfaces of the glass spheres 30. Accordingly, the functional group material 90 serves to adhere, magnetically, the silica-based material 40 with the glass spheres 30.

It is contemplated that the functional group material 90 can include, but is not limited to, at least one of an amine functional group, an amino functional group, a silanol functional group, and a silane functional group, combinations thereof, and other similar functional group materials 90. According to the various embodiments, typically, hollow glass spheres 30 and particles of the silica-based material 40 are generally hydrophilic in nature and contain a slightly negative charge and typically repel one another such that the insulating material does not properly adhere to the glass spheres 30.

Referring again to FIGS. 8 and 9, the use of the functional group material 90 alters the magnetic characteristics of the hollow glass spheres 30 to generate a slightly positive charge on the outer surface 84 of the hollow glass spheres 30. Accordingly, the now positively charged hollow glass spheres 30 attract the negatively charged silica-based material 40, such that the majority of the interstitial volume 42 can be occupied by the silica-based material 40. As discussed above, the size of the gaseous pores 44 defined between the silica-based material 40 can be along the order of less than one micron. This small gaseous pore size leads to lower gaseous conductivity within the core material 12 using the super-insulating material 10.

Referring again to FIGS. 8, 9 and 18, in implementing the method 500, the coating material 80 can also be a binder material 100. It is contemplated that the binder material 100 can serve to generate an adhesive surface over the glass spheres 30. In such an embodiment, the silica-based material 40 adheres to the glass spheres 30 via the binder material 100. It is further contemplated that the binder material 100 can include an organic and/or inorganic binder. It is also contemplated that the binder material 100 can include, but is not limited to, cellulose, wax, polyethylene glycol, gelatin, starch, polyvinyl alcohol, polymethacrylates and sodium silicate, combinations thereof, and other similar adhesives and/or binder materials 100.

In using a binder material 100 as the coating material 80, a relatively small amount of organic/inorganic binder, along the order of approximately 10 percent by weight, can be infused with or coated around the glass spheres 30 during an initial mixing process within the drum 32. It is also contemplated that various spray processes using high or low pressure sprayers can be used to apply the binder before the addition of the silica-based material 40. The binders used are compatible with both the outer surface 84 of the glass spheres 30 as well as the silica-based material 40 from an adhesion standpoint. It is contemplated that relatively medium to high temperature can also be used during the mixing process to ensure that the hollow glass spheres 30 are uniformly coated by the binder material 100. Once the hollow glass spheres 30 are coated, typically after a few minutes of mixing, approximately 20 percent up to approximately 60 percent by volume of the silica-based material 40 can be added, followed by a subsequent mixing process. As discussed above, the binder material 100 facilitates the adhesion of the silica-based material 40 to the outer surface 84 of the glass spheres 30. As with processes previously described, the gaseous pores 44 resulting from this process can have a size of less than 1 micron in diameter.

Figure 10:
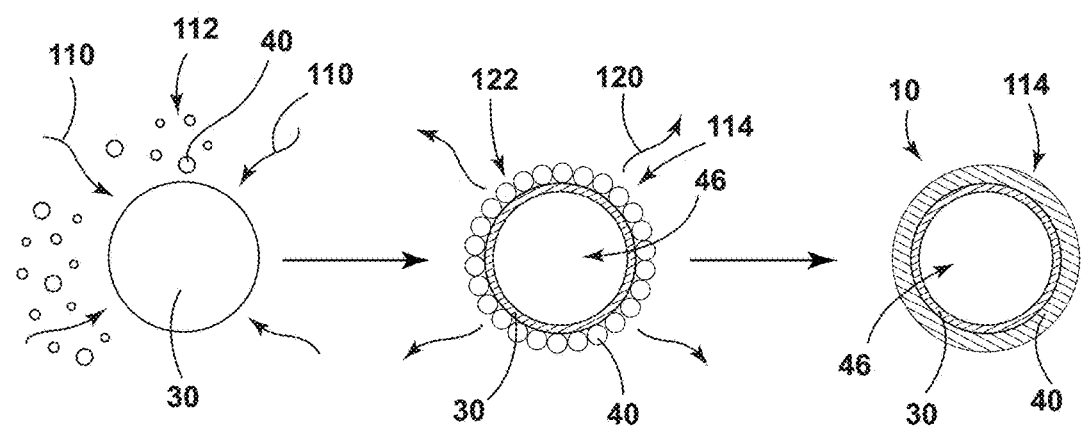
FIG. 10 is a schematic diagram illustrating a method for using a method of precipitation for attaching a silica-based material to a glass sphere.
Figure 11:
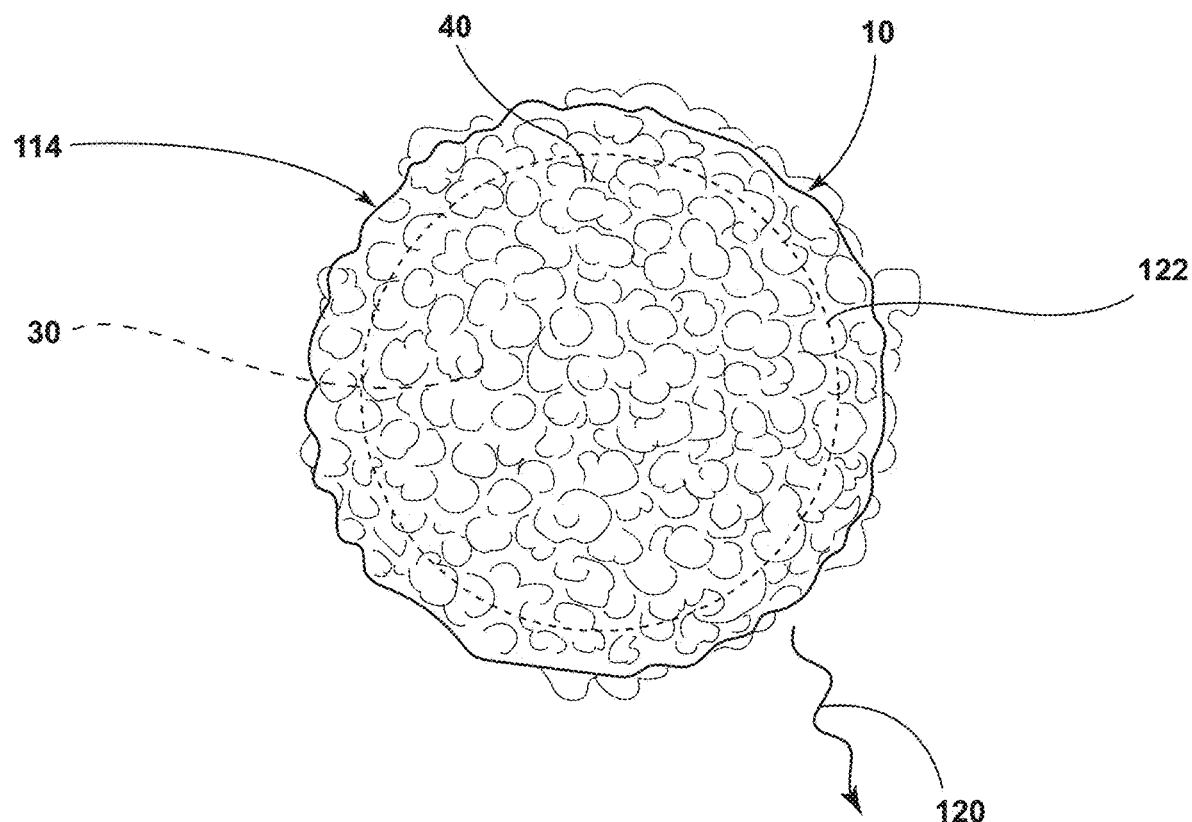
FIG. 11 is a perspective view of a coated glass sphere made according to the method exemplified in FIG. 10.
Figure 12:
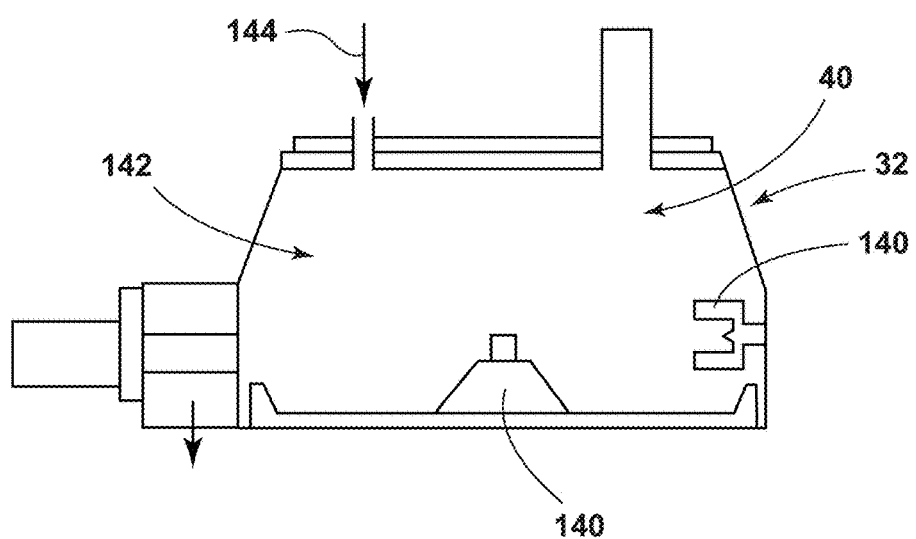
FIG. 12 is a schematic cross-sectional view of a mixing drum used to formulate an aspect of the super-insulating material.
Figure 13:
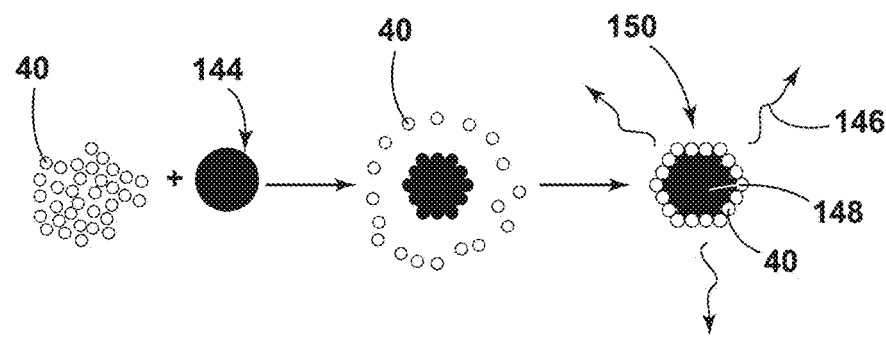
FIG. 13 is a schematic diagram illustrating a method of wet granulation to form a densified silica-based mixture.
Figure 14:
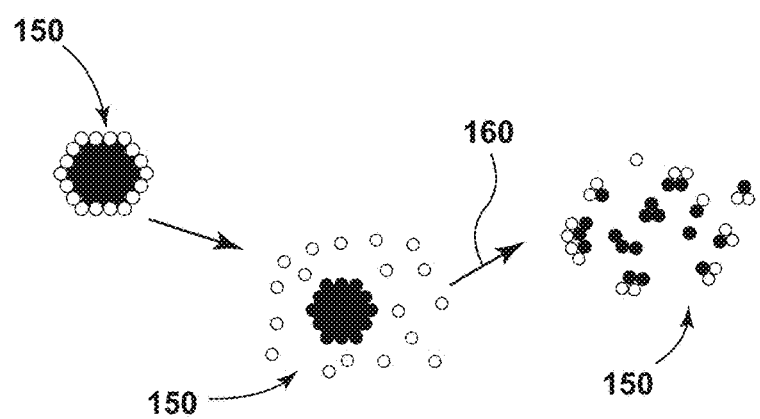
FIG. 14 is a schematic diagram illustrating an aspect of the method exemplified in FIG. 13 showing partial fragmentation of the densified silica-based mixture according to at least one milling process.
Figure 15:
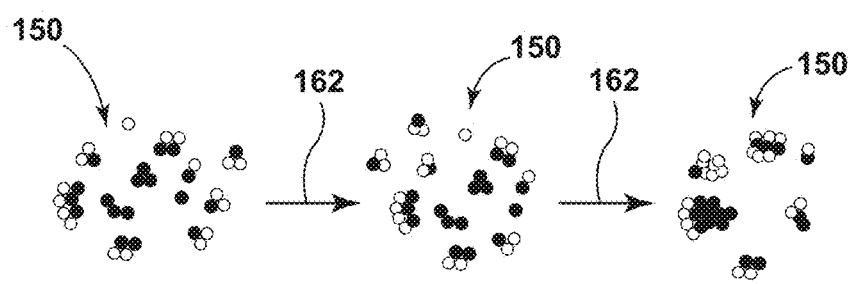
FIG. 15 is a schematic diagram exemplifying further milling processes of the densified silica-based mixture.
Figure 16:
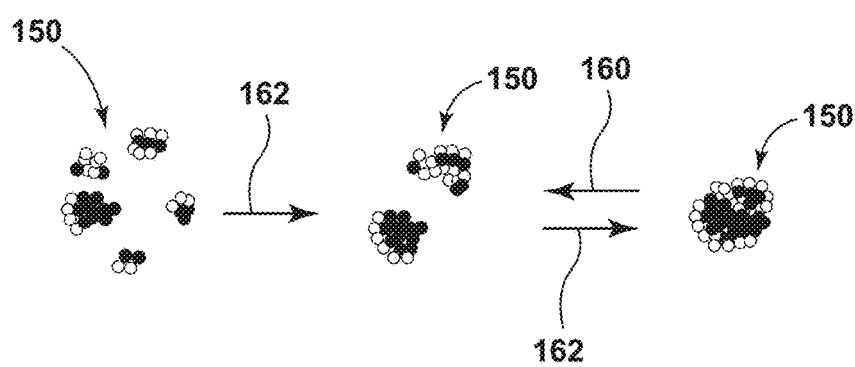
FIG. 16 is a schematic diagram illustrating further milling processes of the densified silica-based mixture for forming an aspect of the super-insulating material.
Figure 17:
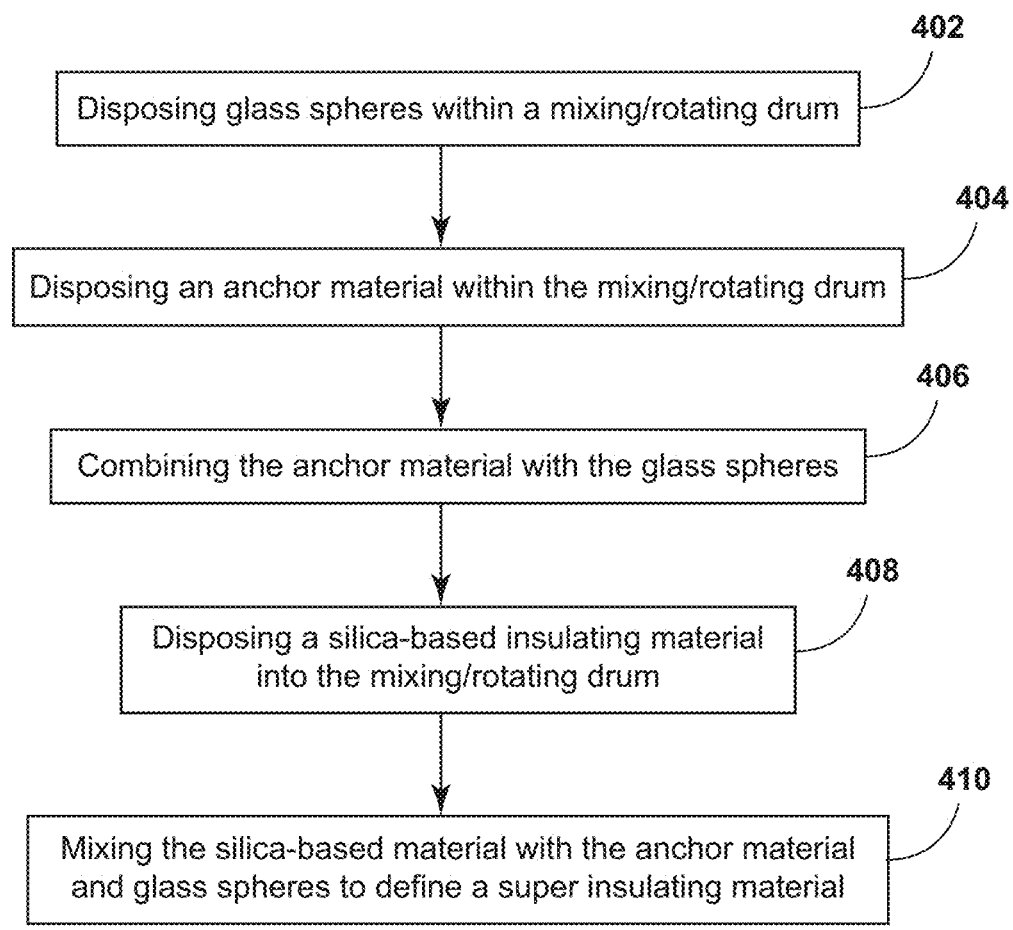
FIG. 17 is a schematic flow diagram illustrating a method for forming a super-insulating material for a vacuum insulated structure.
Figure 18:
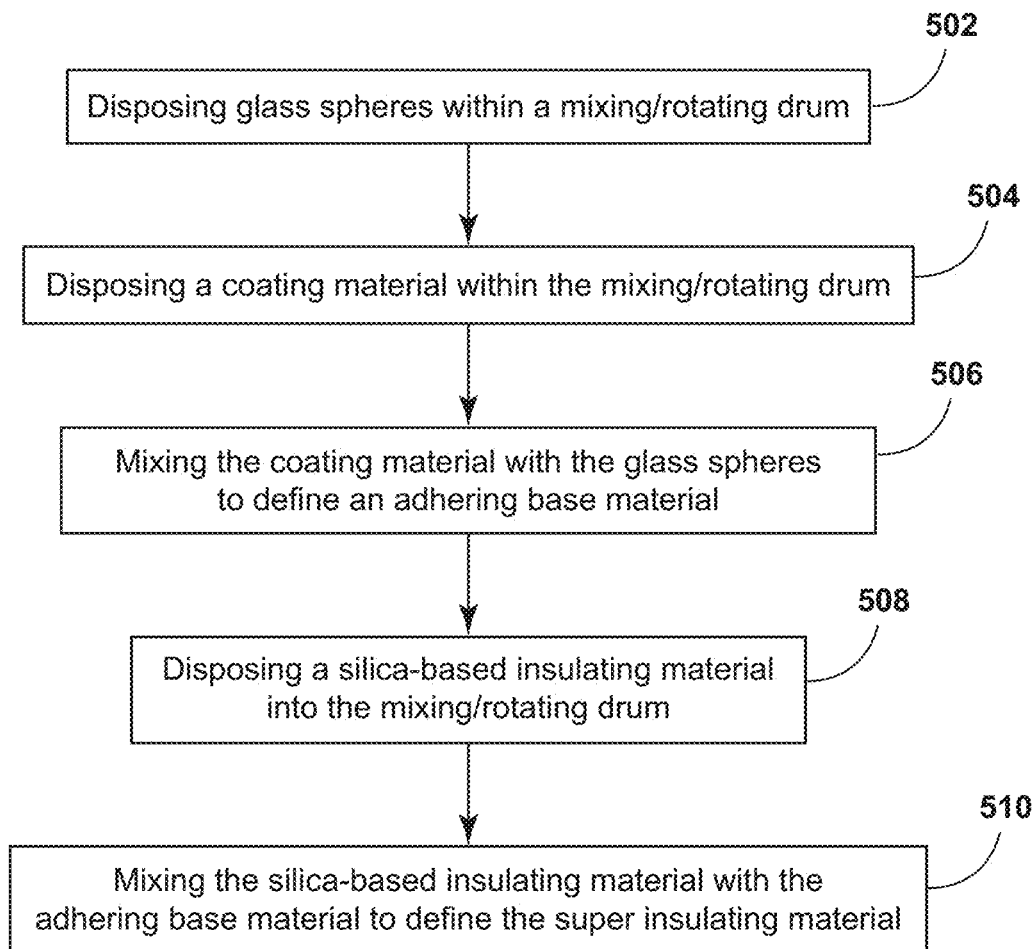
FIG. 18 is a schematic flow diagram illustrating a method for forming a super-insulating material for a vacuum insulated structure.
Figure 19:
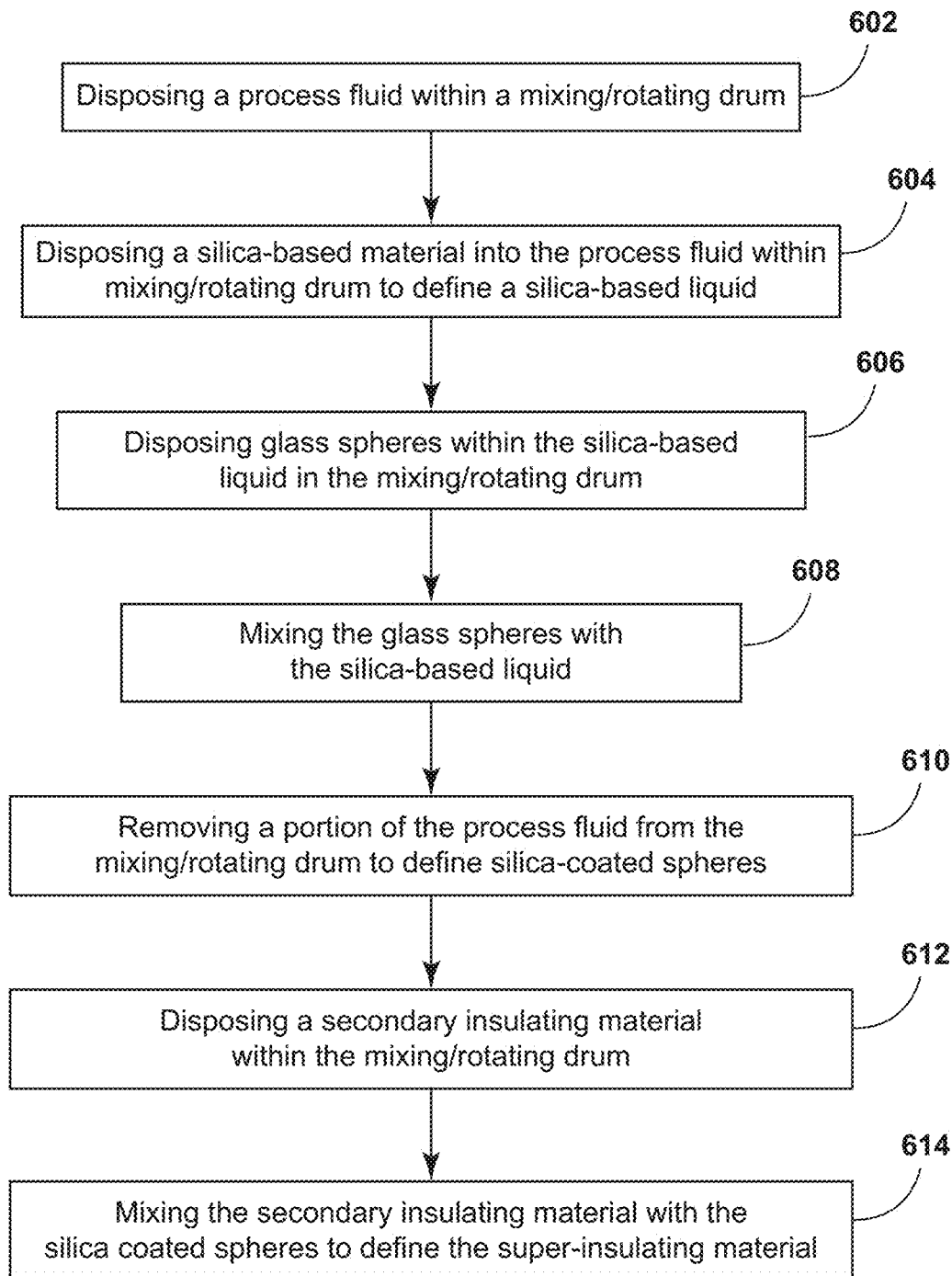
FIG. 19 is a schematic flow diagram illustrating a method for forming a super-insulating material for a vacuum insulated structure.
Figure 20:
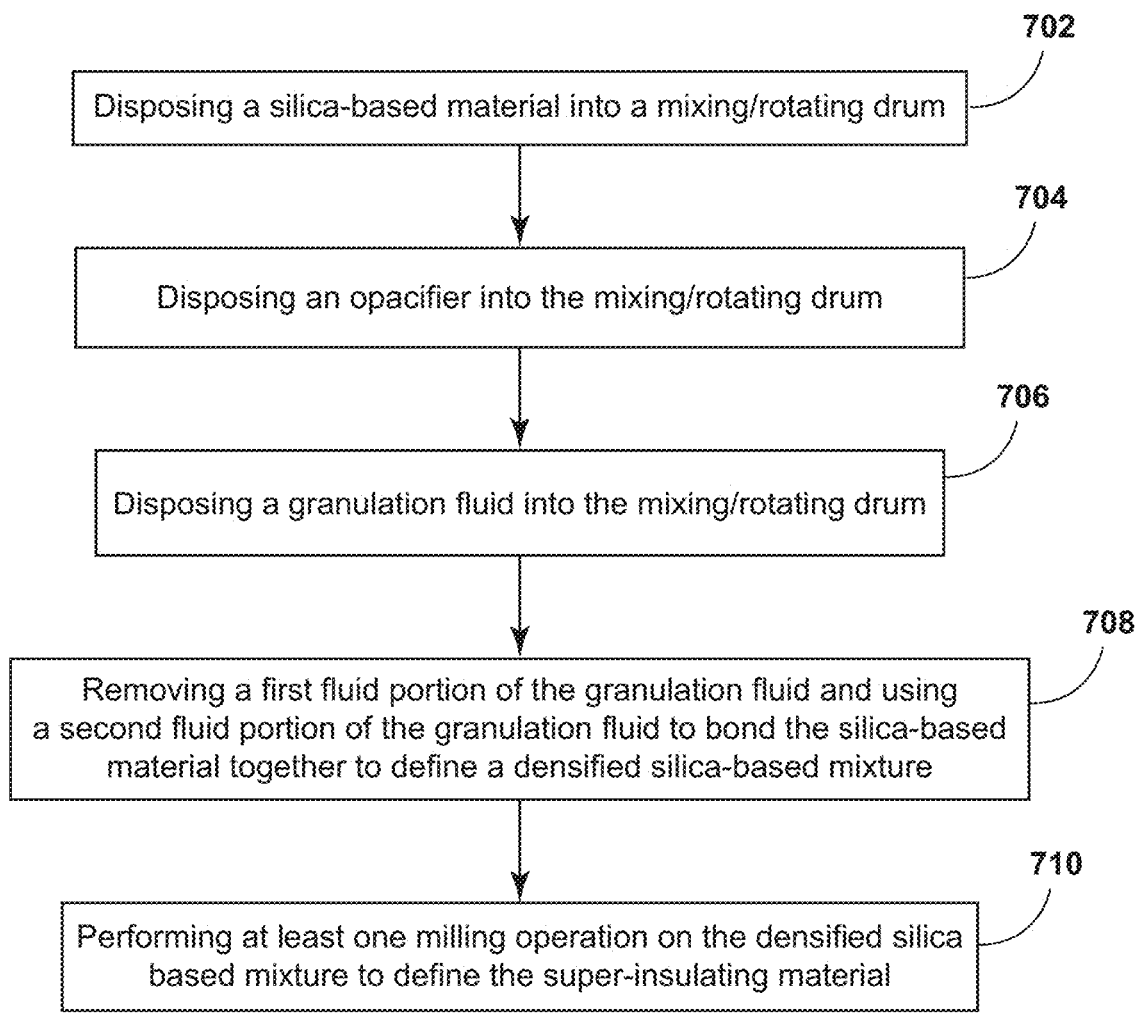
FIG. 20 is a schematic flow diagram illustrating a method for forming a super-insulating material for a vacuum insulated structure.

Referring now to FIGS. 10, 11 and 19, a method 600 is disclosed for forming a super-insulating material 10 for use within a vacuum insulated structure 14 for an appliance 22. According to the method 600, a process fluid 110 can be disposed within the mixing and/or rotating drum 32 (step 602). The silica-based material 40 is also disposed within the drum 32 to be combined within the fluid to form a silica-based liquid 112 (step 604). The glass spheres 30 can then be disposed within a silica-based liquid 112 (step 606). After addition of the glass spheres 30 with the silica-based liquid 112, these components are mixed within the drum 32 (step 608). After the glass spheres 30 and the silica-based liquid 112 are mixed, at least a portion of the process fluid 110 from the silica-based liquid 112 is removed (step 610). Removal of at least a portion of the process fluid 110 from the silica-based liquid 112 results in the silica-based material 40 being adhered to the glass spheres 30 to define silica-coated spheres 114 that form the super-insulating material 10. It is contemplated that the surface of the silica-coated spheres 114 is indicative of the silica-based material 40. In this manner, when the silica-coated spheres 114 are mixed together, the silica-based material 40 disposed on the glass spheres 30 intermingles to form a minimal amount of gaseous pores 44 between the silica-coated spheres 114.

Referring again to FIGS. 10, 11 and 19, in various embodiments, where the gaseous pores 44 may have a larger size between the silica-coated spheres 114, a secondary insulating material 38 can be disposed into the rotating drum 32 (step 612). It is contemplated that the interstitial space 34 can be defined between the silica-coated spheres 114 and the mixing of the secondary insulating material 38 with the silica-coated spheres 114 defines the super-insulating material 10. It is contemplated that the secondary insulating material 38 can, in such an embodiment, occupy substantially all of an interstitial volume 42 defined by the interstitial spaces 34 between the silica-coated spheres 114 (step 614).

Referring again to FIGS. 10, 11 and 19, it is contemplated that the process fluid 110 used in method 600 can include various components, where these components can include, but are not limited to, styrene, polyvinyl pyrrolidone, potassium persulfate, tetraethyl orthosilicate, an ammonium hydroxide solution, absolute ethanol, water and oil, combinations thereof, and other similar organic and/or inorganic fluids. It is contemplated that the step of removing the process fluid 110 (step 610) can include a chemical process. In this manner, a first portion 120 of the process fluid 110 may be removed and a second portion 122 of the process fluid 110 serves to bind the silica-based material 40 into the glass spheres 30 to form the silica-coated spheres 114. According to the various embodiments, the step 610 of removing the process fluid 110 can include an evaporating process where at least a portion of the process fluid 110 from the rotating drum 32 is evaporated, thereby leaving the silica-coated spheres 114. Additionally, it is contemplated that the secondary insulating material 38 of step 612 can be a second silica-based material 40 or can be the same as the silica-based material 40 that is coated on the glass spheres 30.

According to the method 600, particles of the silica-based material 40 are precipitated onto the surface of the hollow glass spheres 30, where porous agglomerates of the silica-based material 40 mixed with the hollow glass spheres 30 exhibit large gaseous pores 44 therebetween. These large gaseous pores 44 can result in significant increase in thermal connectivity when the pressure rises from 1 milibar to 10 milibar. Typically, these larger gaseous pores 44 that form the interstitial spaces 34 are believed to be the result of smooth surfaces of the hollow glass spheres 30. Because the silica-based material 40 readily forms amorphous agglomerates that readily aggregate into larger structures with very small gaseous pores 44, the silica-based material 40 coated onto the glass spheres 30 serves to fill the large gaseous pores 44 to result in very small gaseous pores 44 between the silica-coated spheres 114. As discussed above, these gaseous pores 44 can have a size of less than approximately 1 micron. The resulting silica-coated spheres 114 serve as a super-insulating material 10 since the resulting super-insulating material 10 has desirable qualities of hollow glass spheres 30 such as flowability, density, and resistance to compaction. This is combined with the low gaseous pore size of the micro-agglomerates of the silica-based material 40. These two materials combine through the various coating processes of method 600 to form a composite material that generates the super-insulating material 10 with minimal gaseous voids and better insulating properties.

Referring now to FIGS. 12-16 and 20, a method 700 is disclosed for forming the super-insulating material 10 for a vacuum insulated structure 14 for an appliance 22. According to the method 700, a silica-based material 40 is disposed into a rotating and/or mixing drum 32 (step 702). It is contemplated that the drum 32 can include at least one mixing impeller 140 such as a high shear impeller 140 or potentially twin screws for mixing the contents thereof. An opacifier 142 can also be disposed within the mixing drum 32 (step 704). It is contemplated that a silica-based material 40 is mixed with the opacifier 142. It is contemplated that the silica-based material 40 and opacifier 142 can be mixed before being transported to the mixing drum 32, or can be mixed within the mixing drum 32. According to the method 700, a granulation fluid 144 is disposed into the drum 32, where the granulation fluid 144 is combined with the silica-based material 40 and the opacifier 142 (step 706). According to the method 700, a first fluid portion 146 of granulation fluid 144 is removed from the drum 32, wherein a second fluid portion 148 of the granulation fluid 144 bonds with a silica-based material 40 to define a densified silica-based mixture 150 (step 708). At least one milling operation 160 is conducted, wherein at least one mixing impeller 140 granulates the densified silica-based mixture 150 to define the super-insulating material 10 (step 710).

Referring again to FIGS. 12-16 and 20, the first fluid portion 146 of the granulation fluid 144 can include at least one solvent. The second fluid portion 148 of the granulation fluid 144 can include a binding material. It is contemplated that the at least one solvent can include at least one of water, ethanol, and/or isopropanol. According to the various embodiments, it is contemplated that the at least one solvent can be removed during step 708 during the evaporation process. Instead of an evaporation process, it is contemplated that granulation fluid 144 can be disposed in the mixing drum 32 as a steam-injected material. It is contemplated that the granulation fluid 144 can also be added as a moisture composition and can be alcohol based or can include various binders such as wax and other similar forms of polyvinyl pyrollidone (PVP). This second fluid portion 148 of the granulation fluid 144 that comprises one or more binders serves to form polar bonds with the silica-based material 40 to define the densified silica-based mixture 150. It is contemplated that the use of PVP can be advantageous as an insulating component since PVP has been found to be food safe as recognized by the Food and Drug Administration for many uses. As discussed above, the dissolved PVP serves to form polar bonds with the silica-based material 40 as the solvent is removed through the performance of the evaporation and/or other drying process. According to the various embodiments, the various milling operations 160 of step 710 can be conducted until the densified silica-based mixture 150 defines the desired granule size. It is also contemplated that the milling operation 160 can include at least one coalescing process 162. In the at least one coalescing process 162, milled densified silica-based mixture 150 can be recombined to form an enlarged densified granules. Accordingly, various densification and coalescing steps can be performed during the one or more milling operations 160 to achieve precise granule size of the densified silica-based mixture 150 to form the super-insulating material 10.

According to the method 700, the various milling process can be used to optimize the size, density and intragranular porosity and structural stability of the densified silica-based mixture 150 as needed to support the product design. The densified silica-based material 40 provides a greater resistance to compression, in particular, inward forces experienced in the expression of gas 20 from a vacuum insulated structure 14.

According to the various methods 400, 500, 600, 700 used to form the various aspects of the super-insulating material 10, it is contemplated that the various methods can include additional steps of disposing a super-insulating material 10 into an insulating cavity 16 of an insulating structure 18. As discussed above, gas 20 can be expressed from the insulating cavity 16 to define an at least partial vacuum within the insulating cavity 16. Once the partial vacuum is formed, the insulating cavity 16 can be sealed to define the vacuum insulating structure 18. According to the various embodiments, the vacuum insulated structure 14 can be defined by a panel 170 where the vacuum insulated structure 14 is a vacuum insulated panel. Additionally, the insulating structure 18 can take the form of an appliance cabinet 172 made from an outer wrapper 174 and an inner liner 176 that can be attached to define an insulating cavity 16 therein. According to such an embodiment, the vacuum insulated structure 14 can take the form of a vacuum insulated cavity.

According to the various embodiments, the advantage of the various processes of method 700, which may be referred to as wet granulation, is that the amount of dust generation can be minimized through the use of the granulation fluid 144 that is added to the opacifier 142 and silica-based material 40 mixture. This dust, in conventional processes, can result in inadvertent inhalation as well as wasted material.

As discussed above, the use of the various processes exemplified in methods 400, 500, 600 and 700 can be used to form a densified super-insulating material 10 that can serve to resist the inward compressive forces experienced during evacuation of gas 20 and forming a vacuum insulated structure 14. The dense nature of the super-insulating material 10 resists crushing and provides a resistive outward force to prevent inward vacuum bow of the various components of the vacuum insulated structure 14. Additionally, the various methods 400, 500, 600, 700 described herein create a minimal amount and minimal size of gaseous pores 44 of less than one micron within the super-insulating material 10. These characteristics provide a better insulating functionality for the vacuum insulated structure 14.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A super-insulating material for use in an insulated structure, the super-insulating material comprising:
   a plurality of glass spheres defining interstitial spaces therebetween;
   a coating material disposed at least partially on outer surfaces of the plurality of glass spheres, wherein the plurality of glass spheres and the coating material define an adhering base material; and
   a silica-based material disposed on at least a portion of the adhering base material, wherein the coating material and the silica-based material occupy substantially all of an interstitial volume defined by the interstitial spaces.

2. The super-insulating material of claim 1, wherein the coating material is a functional group material.

3. The super-insulating material of claim 2, wherein the functional group material defines magnetic characteristics of the plurality of glass spheres to define positively charged glass spheres, and wherein the silica-based material is negatively charged and adheres to the positively charged glass spheres.

4. The super-insulating material of claim 2, wherein the functional group material is at least one of an amine functional group, a silanol functional group, and a silane functional group.

5. The super-insulating material of claim 1, wherein the coating material is a binder material.

6. The super-insulating material of claim 5, wherein the binder material generates adhesive surfaces of the plurality of glass spheres.

7. The super-insulating material of claim 6, wherein the silica-based material adheres to the adhesive surfaces via the binder material.

8. The super-insulating material of claim 5, wherein the binder material includes an organic binder.

9. The super-insulating material of claim 5, wherein the binder material includes at least one of cellulose, wax, polyethylene glycol, gelatin, starch, polyvinyl alcohol, polymethacrylates and sodium silicate.

10. The super-insulating material of claim 1, wherein the plurality of glass spheres are hollow glass spheres.

11. The super-insulating material of claim 1, wherein the silica-based material includes at least one of fumed silica and precipitated silica.

12. The super-insulating material of claim 1, wherein the silica-based material at least partially includes perlite.

13. A super-insulating material for use in an insulated structure, the super-insulating material comprising:
    a plurality of perlite particles defining interstitial spaces therebetween;
    a coating material disposed at least partially on outer surfaces of the plurality of perlite particles, wherein the plurality of perlite particles and the coating material define an adhering base material; and
    a silica-based material disposed on at least a portion of the adhering base material, wherein the coating material and the silica-based material occupy substantially all of an interstitial volume defined by the interstitial spaces.

14. The super-insulating material of claim 13, wherein the coating material is a functional group material.

15. The super-insulating material of claim 14, wherein the functional group material defines magnetic characteristics of the plurality of perlite particles to define positively charged perlite particles, and wherein the silica-based material is negatively charged and adheres to the positively charged perlite particles.

16. The super-insulating material of claim 14, wherein the functional group material is at least one of an amine functional group, a silanol functional group, and a silane functional group.

17. The super-insulating material of claim 13, wherein the coating material is a binder material.

18. The super-insulating material of claim 17, wherein the binder material generates adhesive surfaces of the plurality of perlite particles, and the silica-based material adheres to the adhesive surfaces via the binder material.

19. A super-insulating material for use in an insulated structure, the super-insulating material comprising:
    a plurality of insulating micro-spheres defining interstitial spaces therebetween;
    a coating material disposed at least partially on outer surfaces of the plurality of insulating micro-spheres, wherein the plurality of insulating micro-spheres and the coating material define an adhering base material; and
    a silica-based material disposed on at least a portion of the adhering base material, wherein the coating material and the silica-based material occupy substantially all of an interstitial volume defined by the interstitial spaces.

20. The super-insulating material of claim 19, wherein the plurality of insulating micro-spheres includes at least one of glass spheres and perlite.

* * * * *